United States Patent [19]
Favinger

[11] Patent Number: 5,816,118
[45] Date of Patent: Oct. 6, 1998

[54] CHAIN SAW SHARPENING BENCH

[76] Inventor: Arnold Favinger, 219 Elm Ave., Glen Riddle, Pa. 19037

[21] Appl. No.: 544,657

[22] Filed: Oct. 18, 1995

[51] Int. Cl.$^6$ .................................................. B23D 63/16
[52] U.S. Cl. ................................................ 76/80.5; 76/37
[58] Field of Search ............................... 76/80.5, 36, 37; 269/130, 131, 296

[56] References Cited

U.S. PATENT DOCUMENTS

| | | | |
|---|---|---|---|
| 3,877,324 | 4/1975 | Silvey | 76/80.5 |
| 4,175,736 | 11/1979 | Dietlein | 269/296 X |

*Primary Examiner*—Douglas D. Watts
*Attorney, Agent, or Firm*—Laurence Weinberger

[57] ABSTRACT

A chain saw stabilizing bench is disclosed which permits the sharpening of chain saw cutting teeth under field conditions. The bench consists of an extended planar platform for holding the weight of the saw and an upright holder for securing the saw bar against movement. The bench platform may be supported between upright supports or on any relatively flat surface such as the ground. A fastening means holds the chain saw securely to the bench. A seat at the end of the bench opposite the upright bar holder is provided for the person using the bench and positions the person so that both hands may work the sharpening file while easily and comfortably applying downward force on the file. The weight of the person using the bench keeps the bench from moving.

9 Claims, 4 Drawing Sheets

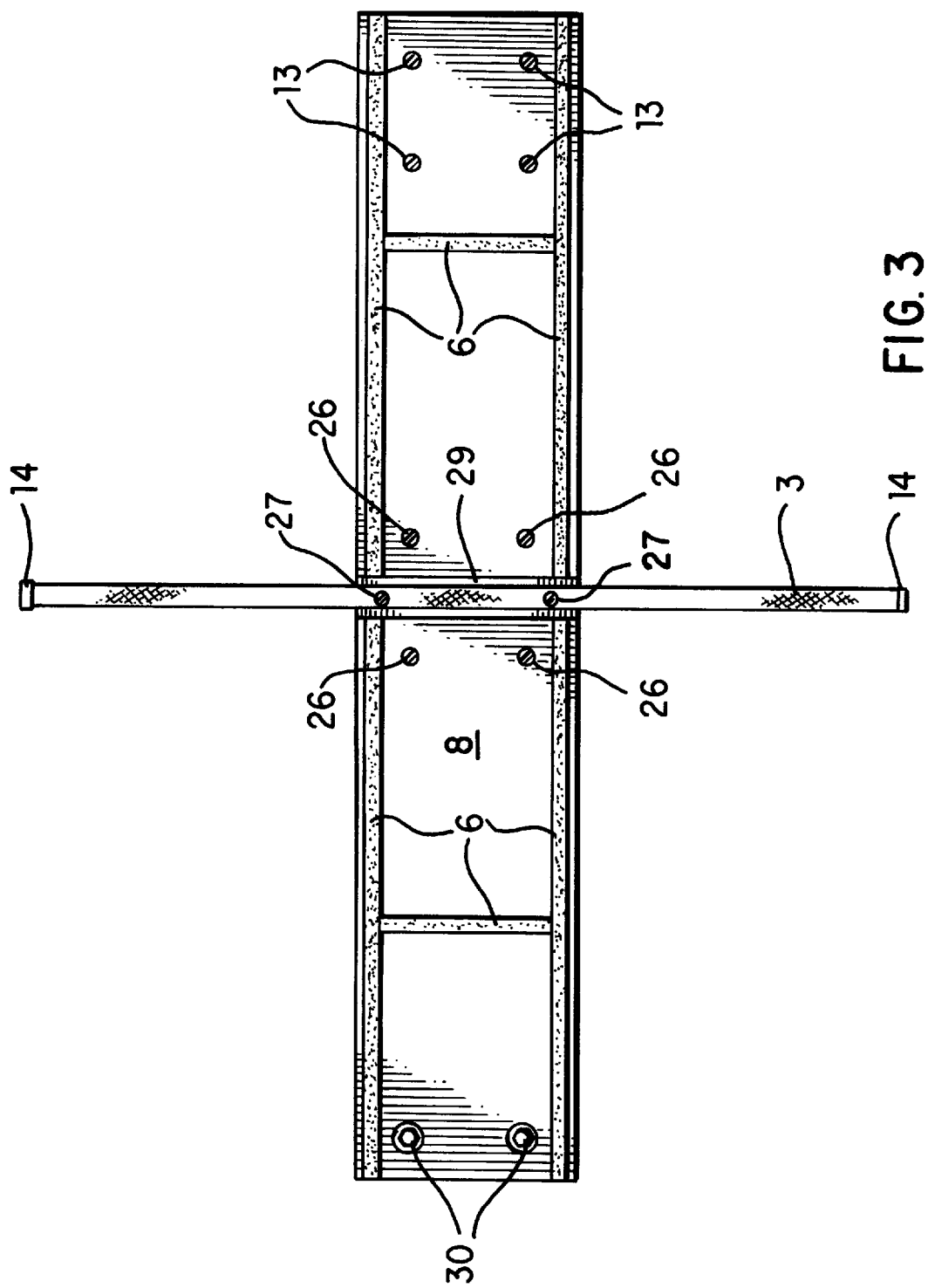

CHAIN SAW SHARPENING BENCH

BACKGROUND OF THE INVENTION

This invention concerns chain saws, and more particularly a portable stabilizer bench which can be used in the field away from a workshop to position and securely hold a chain saw so that its cutting teeth may be sharpened without removal.

BACKGROUND OF THE INVENTION

The cutting teeth on chain saw blades dull at an unpredictable rate depending on the severity of the cutting required of the saw. The type of wood, the moisture content of the wood, and the force exerted by the operator of the chain saw are all variables determining the rate at which the teeth dull. A chain saw with dull teeth not only cuts more slowly but can be a safety hazard to the operator due to the increased effort and force needed to drive the saw through the wood. Saws used in climbing and trimming must be kept particularly sharp. Thus, a cutting chain which is sharp at the start of a day's work may easily become too dull before the work is completed. One solution for the operator is to change chains, a process which requires not only a supply of extra chains, but proper tools and a clear work surface. Typically, under field working conditions, this option is not exercised unless a chain breaks. More likely, the operator elects to perform a quick sharpening of the cutting teeth using an easily carried file.

However, to properly sharpen the teeth, the file should be maintained at a fixed angle to the teeth and all teeth should be sharpened to the same depth. Quality sharpening of the teeth is achieved in the workshop by removing the chain from the saw and clamping it in a fixed jig. Semi-portable devices are available which clamp onto the chain saw bar to guide the operator in the proper sharpening of the chain teeth. An example of such a device is shown in U.S. Pat. No. 5,107,726 by Wilhite et al. If necessary, an experienced operator can even quickly sharpen the teeth with a file free hand; essentially guessing at the correct angle and depth. In either case, field sharpening is usually difficult due to movement of the chain saw itself. Filing of the chain teeth while the chain is on the saw exerts a force more or less perpendicular to the length of the bar. Since most of the mass of the chain saw is in the motor and housing and not the chain or bar, a substantially perpendicular force applied to the chain on the extended bar applies a torque to the chain saw causing it to rotate about a point in the motor housing. Thus, it is necessary to firmly brace the chain saw in order to use a file to sharpen the teeth. In addition, it is difficult to maintain the correct position and angle of the file, even with attached guides, when the file is used from only one side of the bar and pushed across the chain saw teeth. More controlled and accurate filing is achieved when the file is held in two hands, one on either side of the bar, as it is drawn across the teeth.

Typically, for field sharpening, the chain saw is rested on the back of a truck or on a log and secured by the operator from rotation with one hand while the operator's other hand works the file. The chain saw is lifted and repositioned every time the chain needs to be rotated to reach the next teeth. Alternatively, the chain saw may be rested on the ground between the operators legs, being careful that dirt does not get onto the chain or bar, so that the operator can use his/her weight to stabilize the saw and both hands to direct the file. The quality of the sharpening achieved under these circumstances is minimal resulting in poor cutting performance and reduced chain life as well as additional risk to the operator.

Several devices have been designed to aid in field sharpening of chain saw blades. U.S. Pat. No. 4,503,735 by Jackson teaches a device which can rigidly clamp a chain saw blade and even lock the chain from moving during sharpening. However, Jackson does not demonstrate a field mounting for his clamp although he recites that it may be fastened to a support. Vandecoevering, in U.S. Pat. No. 4,109,900 discloses a clamp which can be mounted with a spike into a tree stump or tree trunk. The clamp secures the chain saw bar but does not provide for support for the weight of the chain saw itself. A better design is seen in U.S. Pat. No. 4,657,234 by Stout in which a holder is disclosed which attaches to the handle of the body of a chain saw and which, itself, attaches to a support means with a clamp. The holder may engage the chain saw handle in many orientations so that the chain saw may be held level no matter what the orientation of the support means the holder's clamp is attached to. However, this device does not secure the bar firmly, and the rigidity of the support depends on the firmness of the clamp and the support means. Stout also discloses the use of this clamp on the tailgate of a pick-up truck. At least in this embodiment, the weight of the chain saw does not have to be supported by the holder's clamp. DeRoy in U.S. Pat. No. 4,248,412 discloses a device which not only clamps the chain saw blade securely, but also provides for support of the weight of the chain saw, provided a vertical stump is available. However, in DeRoy's device, the saw is held up-side down which may permit fuel to leak or flood the hot engine creating a potentially hazardous condition.

SUMMARY OF THE INVENTION

The present invention consists of a portable chain saw sharpening bench which may be used at any location by simply placing it between two supports or on any relatively flat surface such as the ground. The bench provides a platform for supporting the weight of the chain saw, a holding block for securing the chain saw bar and chain against the forces of sharpening, a fastener for securing the chain saw to the bench, and a seat for the person sharpening the cutting teeth. When seated on the bench, the person sharpening the saw chain is located above and behind the saw so that both hands may direct the sharpening file and adequate pressure may easily be applied.

It is an object of this invention to provide a portable bench for sharpening the cutting teeth on a saw chain while the chain remains on the bar, and which securely holds the bar and chain so that the force of the sharpening file does not move the saw chain or the bar.

It is a further object of this invention to provide a bench for sharpening saw chain cutting teeth which permits the person sharpening the teeth to easily access the teeth while applying sufficient downward pressure on a sharpening file.

It is yet a further purpose of this invention to provide a bench for sharpening saw chain cutting teeth which may be used either in the field or at a workshop, and which further supports the saw in a normal upright position so that fuel does not leak out during sharpening.

It is an additional purpose of this invention to provide a bench for sharpening saw chain cutting teeth wherein the bench is prevented from movement by the weight of the person using the bench.

Additional features of the invention will become apparent from the detailed description which follows.

BRIEF DESCRIPTION OF THE DRAWINGS

FIG. 3 is a view of the bottom of the sharpening bench.

DETAILED DESCRIPTION OF THE PREFERRED EMBODIMENT

Figure 1:
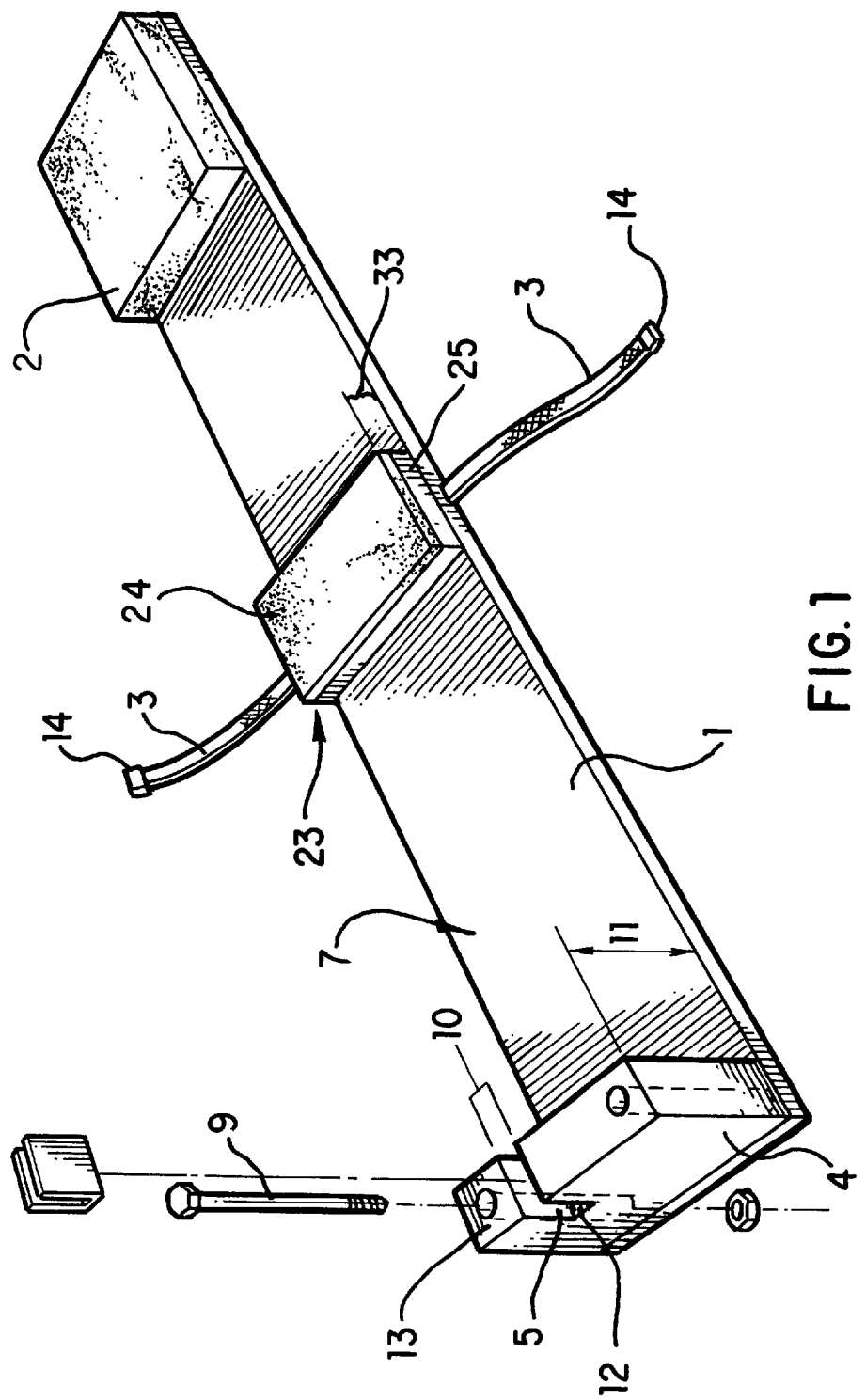
FIG. 1 is an elevated side view of the sharpening bench.

FIG. 1 shows the main features of the sharpening bench of this invention. The sharpening bench has an elongated base 1. Fastened on the top side 7 and towards one end of base 1 is cushioned seat 2, while on the top side 7 at the other end of base 1 a bar and saw chain holding block 4 is fastened to base 1. Approximately mid-way along the top side 7 of base 1 a chain saw rest plate 23 is fastened to base 1. Base 1 is formed from a sufficiently thick and strong material so that it will not flex in use when supported either from its two ends or from just one end, and its width is such that a person using the bench may easily straddle it. In a preferred embodiment base 1 is formed from a piece of wood 35 inches long, 8 inches wide, and ¾ inch thick.

Figure 2B:
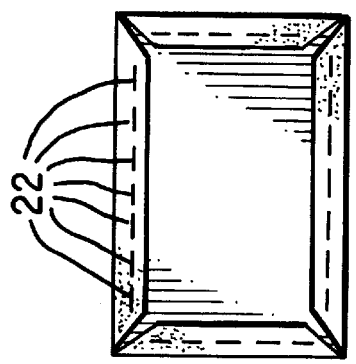
FIG. 2 shows an elevated side view and bottom view of the seat assembly.
Figure 2A:
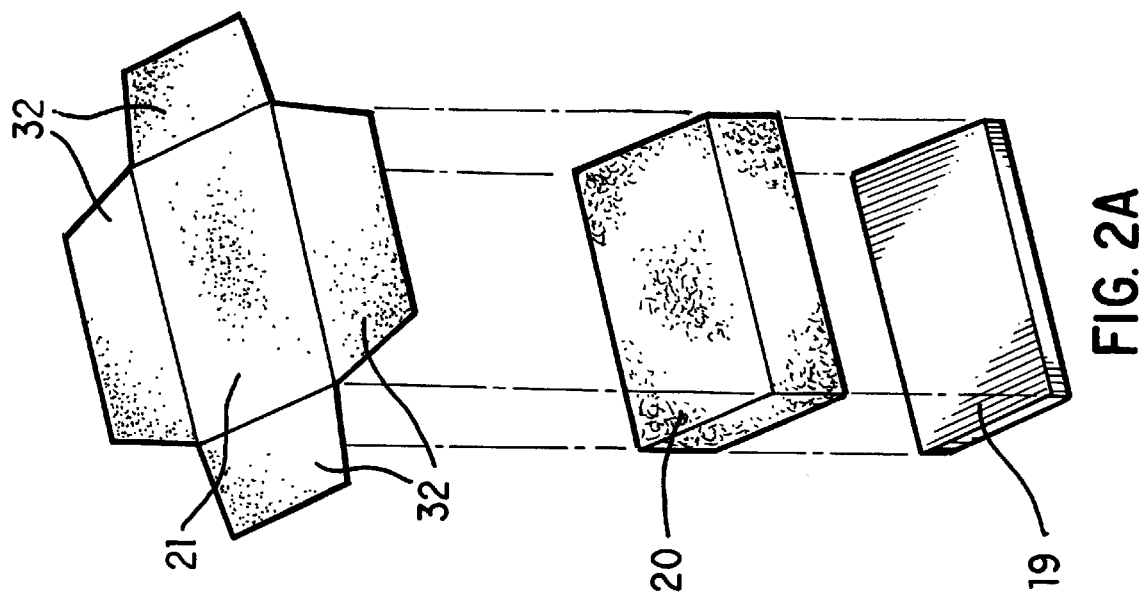

Cushioned seat 2 is removably fastened to base 1 substantially at one end of base 1. Cushioned seat 2 is of a size and thickness appropriate to comfortably seat the user of the sharpening bench in a straddling position. However, if the support used under base 1 makes sitting on cushioned seat 2 while straddling base 1 uncomfortable for the operator when the seat is at one end of base 1, the position of cushioned seat 2 may be moved inward away from the end of base 1. Cushioned seat 2 is removably fastened to base 1 with screws 13 or other fastener means well known in the wood working art. As can be seen in FIG. 2, in a preferred embodiment cushioned seat 2 is formed from wooden seat plate 19 upon which cushioning material 20 such as foam is placed and, if desired, fastened by adhesive or any other appropriate means. A seat cover 21, typically made of a vinyl material, is fastened with folding flaps 32 over cushioning material 20 to seat plate 19 with staples 22 or other fastening means well known in the art. In a preferred embodiment foam 20 is held in place on seat plate 19 by seat cover 21, and cushioned seat 2 is 8 inches wide, 2 inches thick, and 11 inches long and is secured to base 1 with wood screws 13.

Referring again to FIG. 1, chain saw rest plate 23 is located approximately midway between cushioned seat 2 and holding block 4. Rest plate 23 must be large enough to adequately support the motor housing of a chain saw. In addition, the thickness or height 33 of rest plate 23 must provide sufficient clearance above the top surface 7 of base 1 so that, when a chain saw is placed on rest plate 23, the tilting lip located on the forward underside edge of most chain saw motor housings clears the top surface 7 of base 1 so that the chain saw bar rests substantially parallel to base 1. Rest plate 23 is securely fastened to base 1 with fasteners 26 such as screws, bolts, or other fastening devices well known in the wood working art.

In a preferred embodiment, rest plate 23 is formed of support pad 25 to the top surface of which is attached resilient pad 24. Resilient pad 24 may be formed from any resilient material and is designed to provide a non-slip semi-cushioned surface upon which a chain saw motor housing may rest. In a preferred embodiment, resilient pad 24 is formed from dense rubber and is attached to support pad 25 by adhesives. Also in a preferred embodiment, rest plate 23 extends the entire width of base 1 measuring 4×8 inches and is one inch thick to provide the required clearance for chain saw tilting lips. Rest plate 23 is fastened to base 1 with screws 26.

As can be seen in FIGS. 1 and 3, located along the length of base 1 approximately at the middle of rest plate 23 is lashing strap 3. Lashing strap 3 is fastened to the bottom side 8 of base 1 with strap fasteners 27 and the two ends of lashing strap 3 extend around opposite sides of base 1 so that they meet above the top of base 1 approximately above the center of rest plate 23. The ends of lashing strap 3 have connectors 14 which engage each other and permit lashing strap 3 to be tightened. Connectors 14 may be of any type well known in the fastening art such as a non-slip buckle or Velcro fastener. Fasteners 27 may be screws, bolts, or other fasteners well known in the art. The length of lashing strap 3 is sufficient to encompass a motor housing of a chain saw placed on rest plate 23 and the width is sufficient to securely engage the motor housing. In a preferred embodiment, lashing strap 3 is recessed in a channel or groove 29 in bottom surface 8 of base 1 so that lashing strap 3 is flush with bottom surface 8. In the preferred embodiment lashing strap 3 is 30 inches long and one inch wide with non-slip buckle fasteners at either end.

At the end of base 1 opposite cushioned seat 2 a holding block 4 is securely fastened to the top surface 7 of base 1 with fasteners 9. A slot 5 parallel to the long dimension of base 1 extends down from the top surface 13 of holding block 4 towards base 1 approximately ½ of the height 11 of holding block 4. Slot 5 has a width 10 which is slightly larger than the thickness of a chain saw bar with chain attached, typically about ⅜ inch. Viewed from the cushioned seat 2 end of base 1, slot 5 is positioned towards the right hand side of holding block 4 so that it will engage a chain saw bar 17 which is normally mounted on the right hand side of a chain saw. Clearly, however, if a left hand chain saw is made, the position of slot 5 in holding block 4 could be reversed to the left hand side. Holding block 4 is of sufficient height 11 so that the depth of slot 5 is approximately ⅓ the height of a typical chain saw bar and the chain saw bar will be substantially parallel to the top surface 7 of base 1 when the chain saw housing sits on rest plate 23 and the bar rests on the bottom 12 of slot 5.

Holding block 4 is formed from a material which will not damage the chain saw bar or the cutting teeth on the chain when the chain saw bar with chain is positioned in slot 5. Alternatively, if a material is used for holding block 4 which either would be damaged by the bar or saw chain or would itself damage the bar or saw chain, a U shaped liner for slot 5 of an appropriately resilient material may be employed. In use, the sides of slot 5 prevent any substantial sideways movement of the chain saw bar during the sharpening process while the bottom surface 12 of slot 5 mechanically engages the cutting teeth on the saw chain thereby keeping the saw chain from rotating freely about the bar.

Holding block 4 is of sufficient size to securely hold the chain saw bar and saw chain during the sharpening process. In a preferred embodiment, holding block 4 is formed from a piece of standard 2"×4" wood 8 inches long, and slot 5 is approximately 1½ inches deep in the 4 inch dimension of holding block 4. The depth of slot 5 may be adjusted in combination with the height 33 of rest plate 23 so that the chain saw bar rests substantially parallel to base 1 when a chain saw is mounted on rest plate 23. Holding block 4 is fastened to base 1 with bolts 9 which pass through holding block 4 and base 1 and are secured with nuts 30. The position of rest plate 23 and lashing strap 3 along the length of base 1 may be adjusted with respect to holding block 4. Thus, if a sharpening bench for a chain saw having a short bar is desired, rest plate 23, lashing strap 3, and groove 29 may be moved towards holding block 4 so that the bar may fully engage holding block 4. Alternatively, if a sharpening bench for a chain saw with a long bar is desired, rest plate 23, lashing strap 3, and groove 29 may be moved towards cushioned seat 2.

On the bottom side 8 of base 1 non-slip material 6 is securely fastened. This material helps prevent any movement of base 1 upon its support during the sharpening process. The non-slip material 6 may be arranged in any number of configurations but, preferably, some of the material should be exposed along the whole length of the bottom. In a preferred embodiment, two strips of adhesively backed grit safety tape 1–2 inches wide are adhered along the entire length of the bottom surface 8 of base 1, one strip along each side with two additional strips, one towards each end, extending across the width of the bottom surface 8 of base 1.

In a preferred embodiment of the invention, the distance between the front edge of cushioned seat 2 and the rear edge of rest plate 23 is 6 inches, and the distance between the front edge of rest plate 23 and the rear edge of holding block 4 is 12 inches. However, it should be understood that these dimensions may be changed to accommodate the size of the user and the size of chain saw to be sharpened without departing from the scope of this invention.

To use the sharpening bench of this invention, base 1 is first placed on a stable supporting surface such as a bench or log, the ground, or between two stable upright supports. Alternatively, an additional feature of this invention is that only the seat end may be supported with the weight of the user balancing/offsetting the weight of the bench and chain saw. For instance, this method of support would be used to work off the tailgate of a pickup truck or out the side door of a van.

Figure 4:
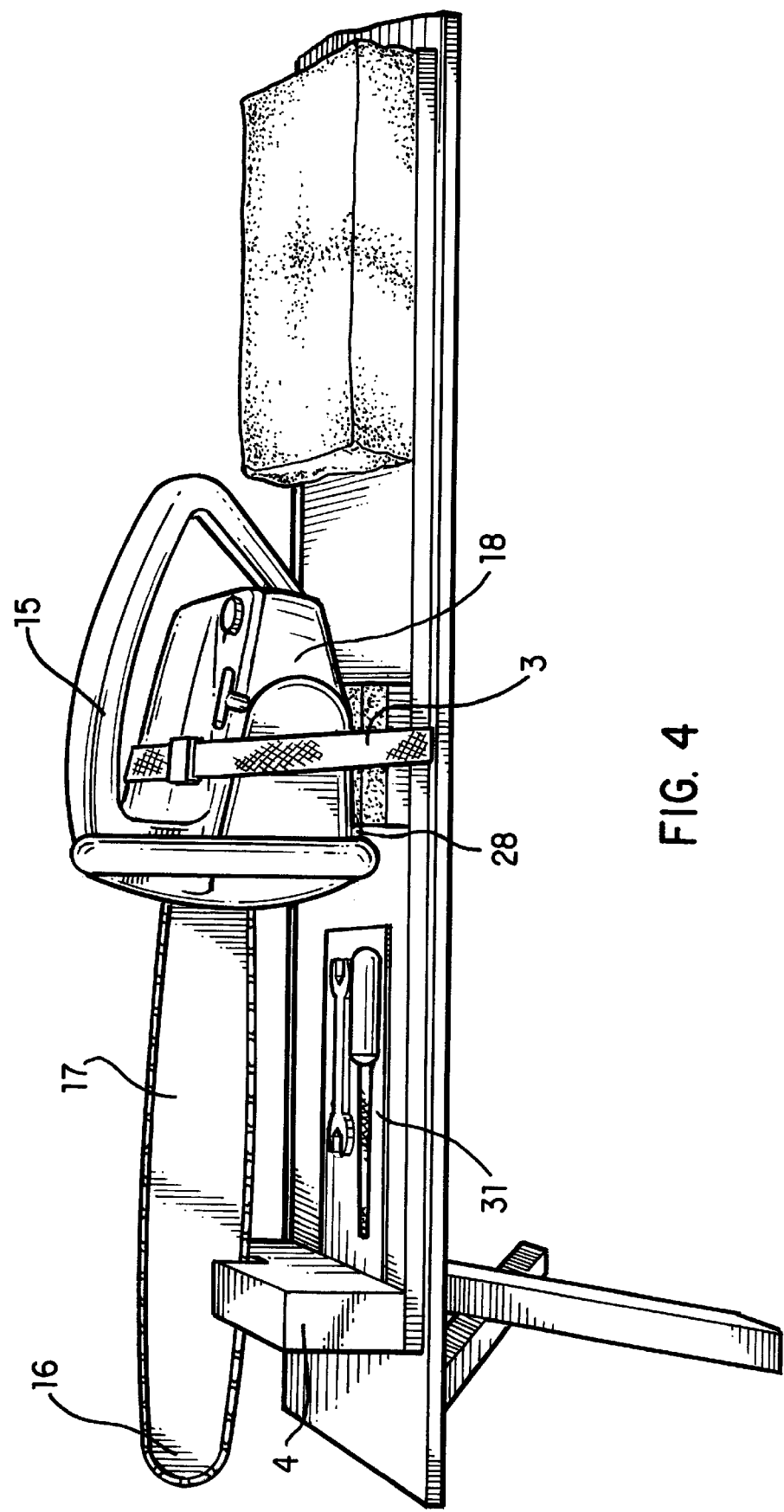
FIG. 4 shows a chain saw mounted on the sharpening bench which is supported on a common style picnic bench.

Most chain saws are designed so that the bar and chain clear the ground or other supporting surface when the saw is not in use. Typically, this is accomplished by a tilting lip 28 which is formed as an integral part of the bottom forward edge of the chain saw motor housing 18. Lip 28 is essentially an extension of housing 18 which protrudes a short distance below the bottom surface of the saw housing 18. Since lip 28 is at the front edge of the housing 18 of the chain saw, it raises the front of the saw relative to its rear when the saw is placed on a relatively flat surface. When a chain saw is placed on the sharpening bench of this invention, the housing 18 should rest on rest plate 23 and lip 28 should overhang the edge of rest plate 23 closest to holding block 4. In this manner, the forward part of the motor housing is not raised relative to the rear of the motor housing and the chain saw bar 17 rests substantially parallel to base 1 thereby placing the chain in the proper position for sharpening. As can be seen in FIG. 4, the chain saw 15 is placed on the sharpening bench so that the cutting teeth of the chain on saw bar 17 rest on the bottom 12 of slot 5 in holding block 4 and the chain saw bar 17 is held between the sides of slot 5 in holding block 4. Mounted in this manner, the end 16 of chain saw bar 17 is free to extend beyond holding block 4. Thus, chain saws of any length are accommodated by the sharpening bench. The cutting teeth of the saw chain mechanically engage the material forming the bottom 12 of slot 5 in holding block 4 and the saw chain is thus prevented from rotational movement around bar 17 of the chain saw.

Once the chain saw is positioned as above, lashing strap 3 is drawn tightly around motor housing 18 of chain saw 15 and secured with strap fasteners 14. Once chain saw 15 is secured to the bench in this manner, slot 5 restricts sideways movement of chain saw bar 17 while strap 3 and non-slip resilient pad 24 prevent chain saw 15 from any substantial movement sideways or forward and back. However, it is still possible to slightly lift the end 16 of chain saw bar 17 so that the chain may be rotated/advanced around the bar 17. After securing the chain saw in the above manner, the operator sits on cushioned seat 2 by straddling the bench. Once seated, the operator is positioned slightly behind and above the chain saw motor housing 18 and may easily reach the cutting teeth on the saw chain which are on the top of bar 17 immediately in front of the chain saw motor housing 18. Sitting in this manner places the operator is in the proper position to sharpen the cutting teeth on the saw chain since the sharpening file may be held in both hands and the weight of the operator is above and behind the file providing an easy downward working posture. When seated in this manner, the operator may sharpen those cutting teeth which are within easy reach. To sharpen additional cutting teeth, the operator may slightly lift the end 16 of the chain saw bar 17 thereby disengaging the cutting teeth from the bottom 12 of slot 5 so that the saw chain may be rotated freely about bar 17 until additional dulled cutting teeth are in position for sharpening. The weight of the operator serves to stabilize the bench to prevent movement of the bench during the sharpening process.

A tool holder 31 may be attached to the bench in a convenient position such as shown in FIG. 4 adjacent to holding block 4. In a preferred embodiment, a magnetic tool holder may be fastened to base 1 with screws. Assorted files, sharpening guides, and adjustment tools may be conveniently stored on the bench in this manner. This invention thus provides a light weight, portable, and easily used sharpening bench which securely positions a chain saw for sharpening of its cutting chain teeth while providing a comfortable working position for the user. While this invention has been described with reference to a preferred embodiment, modifications and adaptations of the basic invention are to be considered within the scope of this disclosure and the accompanying claims.

What is claimed is:

1. A portable chain saw sharpening bench for securely holding a chain saw with attached cutting bar and chain comprising:

(a) a substantially rectangular base having a top and bottom surface, the thickness of the base being substantially less than the width of the base, and the weight bearing areas of the bottom surface being coplanar;

(b) a seat securely fastened to the top surface of the base at one end of the base;

(c) a chain saw rest plate for supporting the chain saw fastened to the top surface of the base substantially midway along the length of the base and having a top surface elevated above the top surface of the base; and (d) a holding block for restraining the cutting bar and chain fastened to the top surface of the base at the end of the base opposite the seat and having a top surface elevated above the top surface of the base in which block a slot extends downwards from its top surface wherein the body of a chain saw may be placed on the chain saw rest plate with the chain bar and attached chain engaged in the slot in the holding block.

2. The chain saw sharpening bench of claim 1 in which the seat comprises:

(a) a seat plate;

(b) cushioning material securely fastened to the seat plate; and (c) a seat cover covering the top and sides of the cushioning material and securely fastened to the seat plate.

3. The chain saw sharpening bench of claim 1 in which the chain saw rest plate comprises:

(a) a support pad; and (b) a pad securely fastened to the top surface of the support pad, the pad formed from a resilient material.

4. The chain saw sharpening bench of claim 3 in which the resilient pad is formed from dense rubber.

5. The chain saw sharpening bench of claim 1 further comprising a liner for the slot in the holding block, the liner being formed from a resilient material.

6. The chain saw sharpening bench of claim 1 in which the holding block is formed from wood.

7. The chain saw sharpening bench of claim 1 in which the seat may be secured in several positions substantially near one end of the base.

8. The chain saw sharpening bench of claim 1 in which the chain saw rest plate may be secured in several positions substantially near the middle of the length of the base.

9. The chain saw sharpening bench of claim 1 in which the holding block may be secured in several positions substantially near the end of the base opposite the end of the base upon which the seat is secured.

* * * * *